US011491556B2

(12) United States Patent
Liu et al.

(10) Patent No.: US 11,491,556 B2
(45) Date of Patent: Nov. 8, 2022

(54) ADJUSTABLE MANDREL AND FIXTURE

(71) Applicant: CITIC Dicastal Co., Ltd., Qinhuangdao (CN)

(72) Inventors: Huiying Liu, Qinhuangdao (CN); Chong Bai, Qinhuangdao (CN); Xinyuan Cui, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 224 days.

(21) Appl. No.: 17/084,561

(22) Filed: Oct. 29, 2020

(65) Prior Publication Data
US 2021/0129233 A1 May 6, 2021

(30) Foreign Application Priority Data
Nov. 5, 2019 (CN) .......................... 201911072984.3

(51) Int. Cl.
B23B 31/40 (2006.01)

(52) U.S. Cl.
CPC ...... *B23B 31/4053* (2013.01); *B23B 2215/08* (2013.01); *Y10T 279/1033* (2015.01)

(58) Field of Classification Search
CPC ............. B23B 31/4053; B23B 2215/08; Y10T 279/1033
See application file for complete search history.

(56) References Cited

U.S. PATENT DOCUMENTS

| 5,464,233 A | * | 11/1995 | Hanai | B23B 31/4033 |
| | | | | 279/137 |
| 5,503,508 A | * | 4/1996 | Amiguet | B23B 31/4006 |
| | | | | 408/1 R |
| 7,415,766 B2 | * | 8/2008 | Luschei | B23B 5/28 |
| | | | | 29/894.323 |
| 9,731,352 B2 | * | 8/2017 | Xue | B23B 31/402 |
| 10,144,244 B2 | * | 12/2018 | Liu | B23B 31/16258 |
| 10,576,554 B2 | * | 3/2020 | Liu | B23B 5/28 |
| 10,618,121 B2 | * | 4/2020 | Liu | B23C 3/12 |
| 11,072,014 B2 | * | 7/2021 | Xu | B21D 28/30 |

FOREIGN PATENT DOCUMENTS

CN 210756559 U * 6/2020 ......... B23B 31/4053

* cited by examiner

*Primary Examiner* — Eric A. Gates
(74) *Attorney, Agent, or Firm* — IPro, PLLC

(57) ABSTRACT

The present application provides an adjustable mandrel and a fixture. The adjustable mandrel comprises an outer-diameter adjusting assembly and a height adjusting assembly, wherein the external diameter and the height of the mandrel can be adjusted according to wheels in different specifications, the wheels in different specifications are clamped, and the radial positioning of the wheel and the axial positioning of the wheel during second-step processing are realized. Two adjusting systems supplement each other, so that the structure is novel, the concept is ingenious, the universality is high, the application range is wide, and the machining cost is reduced.

18 Claims, 4 Drawing Sheets

ADJUSTABLE MANDREL AND FIXTURE

TECHNICAL FIELD

The disclosure herein relates to the technical field of machining fixtures, and specifically to an adjustable mandrel and a fixture.

BACKGROUND

The machining process of the aluminum alloy wheel is generally completed by two-step turning, wherein the first step is turning a center hole and an inner rim part, while the second step is positioning by the center hole turned in the first step and machining an outer rim part. At present, fixed mandrels are adopted during positioning for most of two-step turning. The fixed mandrels have many drawbacks, such as the inability to adjust the diameter and the height, the need to design and manufacture mandrels of corresponding dimensions when machining wheels of different sizes, with much repeatability and high manufacturing costs.

SUMMARY

Embodiments of the application provide an adjustable mandrel and a fixture, that can adjust the outer diameter and the height of the mandrel according to wheels of different specifications, achieve clamping wheels of different specifications, and there are advantages of great versatility, wide range of applicability, and low machining costs.

In order to achieve the above objectives, the present disclosure provides the following technical solutions:

In a first aspect, provided is an adjustable mandrel, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel.

In some embodiments, wherein the outer-diameter adjusting assembly comprises guide rails, sliders, discs, second springs, a conical block, a pull rod, and an electric cylinder, two or more guide rails are evenly distributed along the circumference, each guide rail is provided with a slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable.

In some embodiments, wherein the height adjusting assembly comprises a cylinder block, a chassis, an oil tube, a valve, and a hydraulic pump, the outer-diameter adjusting assembly is disposed on the chassis, an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the valve is disposed on the oil tube, and a tail end of the oil tube is connected to the hydraulic pump; when the valve is opened, the hydraulic pump extracts the hydraulic oil, and the chassis and the outer-diameter adjusting assembly descend; when the hydraulic pump injects the hydraulic oil, the chassis and the outer-diameter adjusting assembly ascend.

In some embodiments, wherein the outer-diameter adjusting assembly and the height adjusting assembly are linked; the outer-diameter adjusting assembly adjusts the diameter of the circumcircle on the upper end face of the mandrel to be larger, while the outer-diameter adjusting assembly forces the height adjusting assembly to increase the height of the mandrel; the outer-diameter adjusting assembly adjusts the diameter of the circumcircle on the upper end face of the mandrel to be smaller, while the outer-diameter adjusting assembly forces the height adjusting assembly to decrease the height of the mandrel.

In some embodiments, wherein the outer-diameter adjusting assembly comprises guide rails, sliders, discs, second springs, a conical block, a pull rod, and an electric cylinder, two or more guide rails are evenly distributed along the circumference, each guide rail is provided with the corresponding slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable; the height adjusting assembly comprises push rods, a piston, a sleeve, a cylinder block, a chassis, an oil tube, a valve, and an oil cup, the electric cylinder is fixed to an upper surface of the chassis, a bottom surface of the chassis is fixedly provided with the sleeve, upper ends of two push rods are fixed to the conical block, a through hole is formed in the chassis at a position corresponding to each push rod, lower ends of the two push rods pass through the through holes to connect to the piston, and the piston is matched with a cylinder tube in the sleeve; an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the oil tube is provided with the valve, and a tail end of the oil tube is connected to the oil cup; and the electric cylinder drives the conical block to descend, the push rods push the piston to move down, the hydraulic oil in the confined space is squeezed, the chassis moves up along an inner wall of the cylindrical cavity of the cylinder block, making the outer-diameter adjusting assembly ascend; when the valve is opened, the hydraulic oil flows into the oil cup through the oil tube, and the height of the chassis drops, making the outer-diameter adjusting assembly descend.

In some embodiments, wherein the chassis is connected to the bottom of the cylindrical cavity on the upper end of the cylinder block through first springs.

In some embodiments, wherein the outer-diameter adjusting assembly further comprises a column barrel, the column barrel is fixed to the chassis, the guide rails are fixed to the chassis and are located in the column barrel, one end on the outer side of each slider is fixed to an inner wall of the column barrel through the corresponding second spring, and the discs are higher than the column barrel.

In a second aspect, the present application provides a fixture, comprising pressing jaws and a mandrel seat, the pressing jaws being evenly distributed along the circumference, and the mandrel seat being fixed at a central position of the fixture, wherein the fixture further comprises a adjustable mandrel according to any one of the above-mentioned embodiments, and the adjustable mandrel is mounted to the mandrel seat.

Compared with the prior art, the present disclosure has the beneficial effects:

the present disclosure provides an adjustable mandrel and a fixture, which comprise an outer-diameter adjusting assembly and a height adjusting assembly, that can adjust the outer diameter and the height of the mandrel according to wheels of different specifications, achieve clamping wheels of different specifications and radial positioning of the wheels during two-step machining. Two adjusting are congruent, novel, elegant. There are advantages of great versatility, wide range of applicability, and low machining costs.

BRIEF DESCRIPTION OF FIGURES

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

Figure 1:
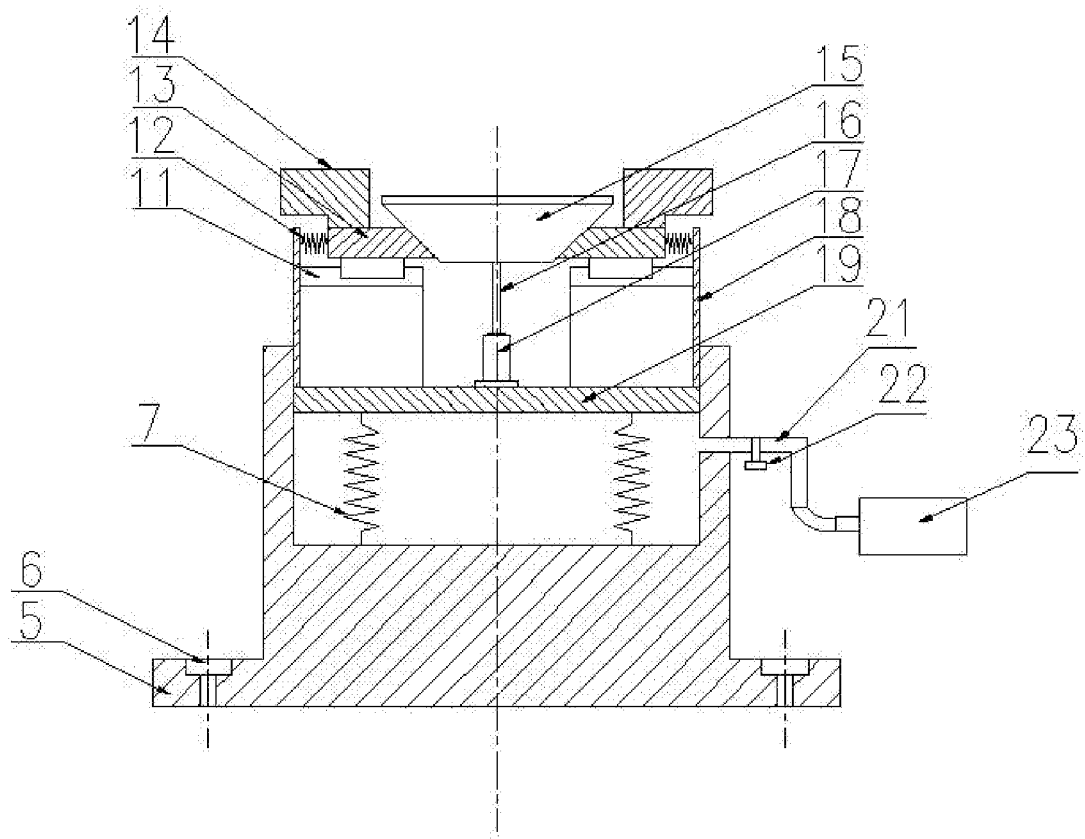
FIG. 1 is a structural schematic diagram of an adjustable mandrel in embodiment 1 of the present disclosure.

List of reference symbols: 1—rotary table, 2—pressing jaw, 3—mandrel seat, 4—mandrel, 5—cylinder block, 6—mounting hole, 7—first spring, 8—sleeve, 9—piston, 10—push rod, 11—guide rail, 12—second spring, 13—slider, 14—disc, 15—conical block, 16—pull rod, 17—electric cylinder, 18—column barrel, 19—chassis, 20—oil cup, 21—oil pipe, 22—valve and 23—hydraulic pump.

DETAILED DESCRIPTION

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In a first aspect, an embodiment of the present disclosure provides an adjustable mandrel, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel. In this embodiment, the mandrel is adjustable in outer diameter and height, and the outer diameter and height of the mandrel can be adjusted to different sizes of wheels, in order to radially position the wheel, with great versatility, wide range of applicability, cost savings and increased production efficiency.

In one embodiment of the present disclosure, wherein the outer-diameter adjusting assembly comprises guide rails, sliders, discs, second springs, a conical block, a pull rod, and an electric cylinder, two or more guide rails are evenly distributed along the circumference, each guide rail is provided with a slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable. The present embodiment provides a specific structural design of the outer-diameter adjusting assembly, which is clever in construction, flexible in adjustment, and effective in positioning using the cooperation of the conical block and the sliding block for size adjustment of the diameter of the circumscribed circle.

In one embodiment of the present disclosure, wherein the height adjusting assembly comprises a cylinder block, a chassis, an oil tube, a valve, and a hydraulic pump, the outer-diameter adjusting assembly is disposed on the chassis, an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the valve is disposed on the oil tube, and a tail end of the oil tube is connected to the hydraulic pump; when the valve is opened, the hydraulic pump extracts the hydraulic oil, and the chassis and the outer-diameter adjusting assembly descend; when the hydraulic pump injects the hydraulic oil, the chassis and the outer-diameter adjusting assembly ascend. In the present embodiment, a height adjusting assembly is provided that uses hydraulic principles and a hydraulic pump to adjust the height of the chassis, to provide an elevation of the outer-diameter adjusting assembly, with reasonable construction, flexible adjustment, and good adjustment.

In one embodiment of the present disclosure, wherein the outer-diameter adjusting assembly and the height adjusting assembly are linked; the outer-diameter adjusting assembly adjusts the diameter of the circumcircle on the upper end face of the mandrel to be larger, while the outer-diameter adjusting assembly forces the height adjusting assembly to increase the height of the mandrel; the outer-diameter adjusting assembly adjusts the diameter of the circumcircle on the upper end face of the mandrel to be smaller, while the outer-diameter adjusting assembly forces the height adjusting assembly to decrease the height of the mandrel. In this embodiment, the outer-diameter adjusting assembly and the height adjusting assembly are linkage, with which linkage synchronous adjustment of the outer diameter and height is achieved, and an external hydraulic pump is omitted.

In one embodiment of the present disclosure, wherein the outer-diameter adjusting assembly comprises guide rails, sliders, discs, second springs, a conical block, a pull rod, and an electric cylinder, two or more guide rails are evenly distributed along the circumference, each guide rail is provided with the corresponding slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable; the height adjusting assembly comprises push rods, a piston, a sleeve, a cylinder block, a chassis, an oil tube, a valve, and an oil cup, the electric cylinder is fixed to an upper surface of the chassis, a bottom surface of the chassis is fixedly provided with the sleeve, upper ends of two push rods are fixed to the conical block, a through hole is formed in the chassis at a position corresponding to each push rod, lower ends of the two push rods pass through the through holes to connect to the piston, and the piston is matched with a cylinder tube in the sleeve; an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the oil tube is provided with the valve, and a tail end of the oil tube is connected to the oil cup; and the electric cylinder drives the conical block to descend, the push rods push the piston to move down, the hydraulic oil in the confined space is squeezed, the chassis moves up along an inner wall of the cylindrical cavity of the cylinder block, making the outer-diameter adjusting assembly ascend; when the valve is opened, the hydraulic oil flows into the oil cup through the oil tube, and the height of the chassis drops, making the outer-diameter adjusting assembly descend. In this embodiment, linkage of the outer-diameter adjusting assembly and the height adjusting assembly is designed in detail, with both parts interacting through push rods, pistons, sleeves, novel construction, clever concept and great versatility, omitting a hydraulic pump, height adjustment through the cooperation of electric cylinders and valves, improved efficiency and energy savings.

In one embodiment of the present disclosure, wherein the chassis is connected to the bottom of the cylindrical cavity on the upper end of the cylinder block through first springs. The provision of the first spring makes that the ascending of the chassis needs overcome the resistance of the spring, while it is labor-saving to adjust the height through the compression force of the chassis against the hydraulic oil and cooperating with the valves on the tubing. Under the combined action of gravity of the components on the chassis and spring force of the spring, opening the valve slightly, hydraulic oil can enter the cup from the tubing and slowly drop in height, allowing controllable adjustment.

In an embodiment of the present disclosure, wherein the outer-diameter adjusting assembly further comprises a column barrel, the column barrel is fixed to the chassis, the guide rails are fixed to the chassis and are located in the column barrel, one end on the outer side of each slider is fixed to an inner wall of the column barrel through the corresponding second spring, and the discs are higher than the column barrel. In this embodiment, to match the wheel center hole while facilitating the securing of the second spring and guide rail, the column barrel component is provided, while isolating the internal structure of the mandrel, preventing machining debris from entering the mandrel interior causing damage to the components, making the device safer and reliable.

In a second aspect, the present disclosure provides a fixture, comprising pressing jaws and a mandrel seat, the pressing jaws being evenly distributed along the circumference, and the mandrel seat being fixed at a central position of the fixture, wherein the fixture further comprises a adjustable mandrel according to any one of the above-mentioned embodiments, and the adjustable mandrel is mounted to the mandrel seat. The present embodiments provide a fixture with an adjustable mandrel to enable radial positioning of the wheel in two-step machining, to adjust the outer diameter and height of the fixture to different specifications of the wheels, to be of great utility, to avoid manufacturing of multiple fixtures, to save cost while saving time to replace fixtures, and to increase the efficiency of machining.

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

In order to further understand the content, features and functions of the disclosure, the following embodiments are given and illustrated with the attached drawings as follows.

Embodiment 1

Embodiment 1 provides an adjustable mandrel, in connection with FIG. 1, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel. Where the outer-diameter adjusting assembly and a height adjusting assembly do not affect each other, and the detailed component structure is shown in FIG. 1.

The outer-diameter adjusting assembly comprises guide rails 11, second springs 12, sliders 13, discs 14, a conical block 15, a pull rod 16, an electric cylinder 17, a column barrel 18. the column barrel 18 is fixed to a chassis 19 of the height adjusting assembly. the guide rails 11 are located within the column barrel 18. Four guiding rails 11 are fixed to the chassis 19 evenly distributed along the circumference. the guide rails 11 are spaced 90 degrees apart. Each guide rail 11 is provided with a slider 13. On each guide rail 11 a slider 13 is mounted. The corresponding second spring 12 is fixed at one end on the outer side of each slider 13, which is fixed to an inner wall of the column barrel 18 through the corresponding second spring 12, and one end on the inner side of each slider 13 is of a conical surface, which is angled down towards the central axis of the mandrel. The corresponding disc 14 is fixedly arranged on an upper surface of each slider 13. The number of discs 14 is Four. The discs 14 are higher than column barrel 18. A pull rod 16 is fixed to a piston rod of the electric cylinder 17. A pull rod 16 is fixed to a bottom surface of the conical block 15. An inclined surface of the conical block 15 is matched with the conical surfaces on the inner sides of the sliders 13. The electric cylinder 17 drives the conical block 15 to move through the pull rod 16. The conical block 15 pushes the sliders 13 to slide along the guide rails 11, and the discs 14 move with the movement of the sliders 13, so that the diameter of a circumcircle formed by vertices on outer sides of all the discs 14 is adjustable. In this embodiment as shown in FIG. 1, piston rod retraction of the electric cylinder 17 moves down the conical block 15, the slope of which forces the slider 13 to move outwards along the guide rail 11 and compresses the second spring 12, so that the discs 14 move outwards with the sliders 13, so that the circumscribed circle consisting of the vertices outside all the discs 14 becomes larger in diameter. Conversely, the piston rod elongation of the electric cylinder 17 moves the conical block 15 upwards, the pressure of the oblique surface of the conical block 15 against the conical surface of the slider 13 decreases, the spring force of the second spring 12 urges the slider 13 to move inwards along the guide rail 11, so that the discs 14 move inwards with the slider 13, so that the diameter of the circumscribed circle consisting of the vertices outside all the discs 14 becomes smaller.

The height adjusting assembly comprises a cylinder block 5, a chassis 19, first springs 7, an oil tube 21, a valve 22, a hydraulic pump 23. The outer-diameter adjusting assembly is disposed on the chassis 19. An upper end of the cylinder block 5 is provided with a cylindrical cavity. The chassis 19 is disposed in the cylindrical cavity, and the chassis 19 is matched with the cylindrical cavity to form a confined space. The chassis 19 is connected to the bottom of the cylindrical cavity at the upper end of the cylinder block 5 via the first spring 7. The confined space is filled with hydraulic oil. A oil tube 21 is drawn from a side wall of the cylindrical cavity of the cylinder block 5. The valve 22 is disposed on the oil tube 21, and a tail end of the oil tube 21 is connected to the hydraulic pump 23. When the valve 22 is opened, the hydraulic pump 23 extracts the hydraulic oil, and the chassis 19 and the outer-diameter adjusting assembly descend (are lowered). Whereas when the hydraulic pump 23 injects the hydraulic oil, the chassis 19 and the outer-diameter adjusting assembly ascend (are raised). Adjustment of the height and outer diameter of both the height adjusting assembly and the outer-diameter adjusting assembly in this embodiment are independent, and the outer diameter and height of the mandrels can be adjusted to different gauge wheels in order to radially position the wheel, with great versatility, wide range of applicability, avoiding the manufacture of mandrels of various heights and diameters, saving costs, and at the same time avoiding the waste of time from replacement of mandrels and increasing production efficiency.

Embodiment 2

Figure 2:
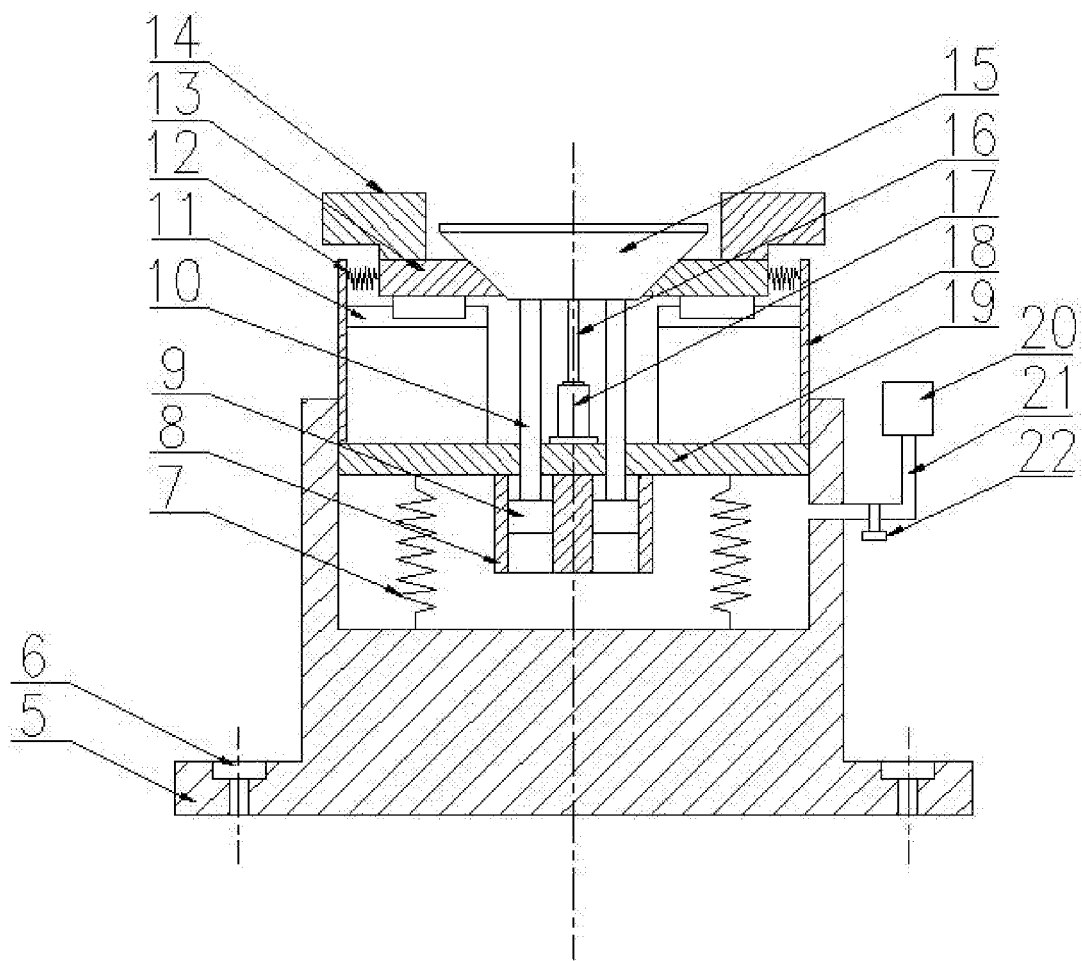
FIG. 2 is a structural schematic diagram of an adjustable mandrel in embodiment 2 of the present disclosure.
Figure 3:
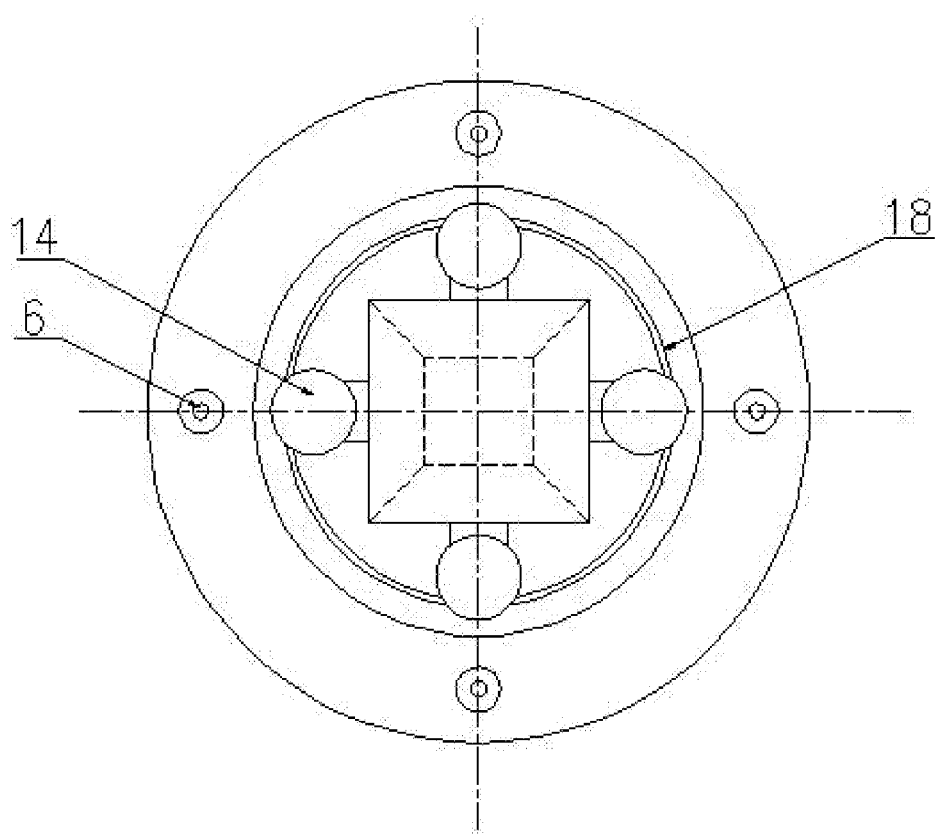
FIG. 3 is a vertical view of an adjustable mandrel in embodiment 2 of the present disclosure.

Embodiment 2 provides an adjustable mandrel, in connection with FIG. 2-3, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel. In this embodiment, the outer-diameter adjusting assembly and the height adjusting assembly are linked. The outer-diameter adjusting assembly adjusts the diameter of the circumcircle on the upper end face of the mandrel to be larger, while the outer-diameter adjusting assembly forces the height adjusting assembly to increase the height of the mandrel. The outer-diameter adjusting assembly adjusts the diameter of the circumcircle on the upper end face of the mandrel to be smaller, while the outer-diameter adjusting assembly forces the height adjusting assembly to decrease the height of the mandrel.

The specific structure is as shown in FIG. 2, the outer-diameter adjusting assembly comprises guide rails 11, second springs 12, sliders 13, discs 14, a conical block 15, a pull rod 16, an electric cylinder 17 and a column barrel 18. The column barrel 18 is fixed to the chassis 19 of the height adjusting assembly. The guide rails 11 are fixed to the chassis 19 and are located in column barrels 18. The four guide rails 11 are evenly distributed on the chassis 19 along the circumference, and the guide rails 11 are spaced by 90 degrees. Each guide rail 11 is provided with the corresponding slider 13. The corresponding second spring 12 is fixed to one end on an outer side of each slider 13. One end on the outer side of each slider 13 is fixed to an inner wall of the column barrel 18 through the corresponding second spring 12. One end of an inner side of each sliding block 13 is a conical surface. The conical surface faces the central axis of the mandrel in an inclined downward direction, and the corresponding disc 14 is fixedly arranged on an upper surface of each slider 13. The number of the discs 14 are four, and the discs 14 are higher than the column barrel 18. The pull rod 16 is fixed to a piston rod of the electric cylinder 17, and the pull rod 16 is fixed to a bottom surface of the conical block 15, and an inclined surface of the conical block 15 is matched with the conical surfaces on the inner sides of the sliders 13. The electric cylinder 17 drives the conical block 15 to move through the pull rod 16, and the conical block 15 pushes the sliders 13 to slide along the guide rails 11, and the discs 14 move along with the sliders 13, so that the diameter of a circumcircle formed by vertices on outer sides of all the discs 14 is adjustable. In the embodiment, as shown in FIG. 2, the piston rod of the electric cylinder 17 contracts to drive the conical block 15 to move downwards, and the inclined surface of the conical block 15 presses the sliders 13 to move outwards along the guide rails 11 and compress the second springs 12, so that the circular discs 14 move outwards along with the slider 13, and the diameter of a circumscribed circle formed by vertexes of the outer sides of all the circular discs 14 is increased. Conversely, the piston rod of the electric cylinder 17 extends to drive the conical block 15 to move upwards, the pressure of the inclined surface of the conical block 15 on the conical surface of the sliders 13 is reduced, the elastic force of the second springs 12 pushes the sliders 13 to move inwards along the guide rails 11, so that the circular discs 14 move inwards along with the sliders 13, and the diameter of a circumscribed circle formed by vertexes of the outer sides of all the circular discs 14 is reduced.

The height adjusting assembly comprises a sleeve 8, a piston 9, push rods 10, a cylinder block 5, a chassis 19, first springs 7, an oil tube 21, a valve 22 and an oil cup 20. The lower end of the cylinder block 5 is provided with a circle of circular ring bulge, and the circular ring bulge is provided with a mounting hole 6 for fixed mounting. The electric cylinder 17 of the outer-diameter adjusting assembly is fixedly to an upper surface of the chassis 19, and a bottom surface of the chassis 19 is fixedly provided with the sleeve 8. Upper ends of two push rods 10 are fixed to the conical block 15, and a through hole is formed in the chassis 19 at a position corresponding to each push rod 10, and lower ends of the two push rods 10 pass through the through holes to connect to the piston 9, and the piston 9 is matched with a cylinder tube in the sleeve 8, and the bottoms of the sleeve 8 and the cylinder tube are open. An upper end of the cylinder block 5 is provided with a cylindrical cavity, and the chassis 19 is disposed in the cylindrical cavity. The chassis 19 is matched with the cylindrical cavity to form a confined space, and the chassis 19 is connected with the bottom of the cylindrical cavity at the upper end of the cylinder block 5 through the first spring 7, and the confined space is filled with hydraulic oil. The bottom of the sleeve 8 and the bottom of the cylinder tube are communicated with the closed space, and the oil tube 21 is drawn from a side wall of the cylindrical cavity of the cylinder block 5, the oil tube 21 is provided with the valve 22, and a tail end of the oil tube 21 is connected to the oil cup 20. The electric cylinder 17 drives the conical block 15 to descend (move downwards), and the push rods 10 push the piston 9 to move down, and the hydraulic oil in the confined space is squeezed, and the chassis 19 moves up along an inner wall of the cylindrical cavity of the cylinder block 5, making the outer-diameter adjusting assembly ascend (rise). when the valve 22 is opened, the hydraulic oil flows into the oil cup 22 through the oil tube 21, and the height of the chassis 19 drops, making the outer-diameter adjusting assembly descend (lower).

In this embodiment 2, linkage of the outer-diameter adjusting assembly and the height adjusting assembly is designed in detail, with both parts interacting through push rods, pistons, sleeves, novel construction, clever concept and great versatility, omitting a hydraulic pump, height adjustment through the cooperation of electric cylinders and valves, improved efficiency and energy savings. As well, the outer diameter and height of the mandrels can be adjusted to different gauge wheels in order to radially position the wheel, with great versatility, wide range of applicability, avoiding the manufacture of mandrels of various heights and diameters, saving costs, and at the same time avoiding the waste of time from replacement of mandrels and increasing production efficiency.

Embodiment 3

Figure 4:
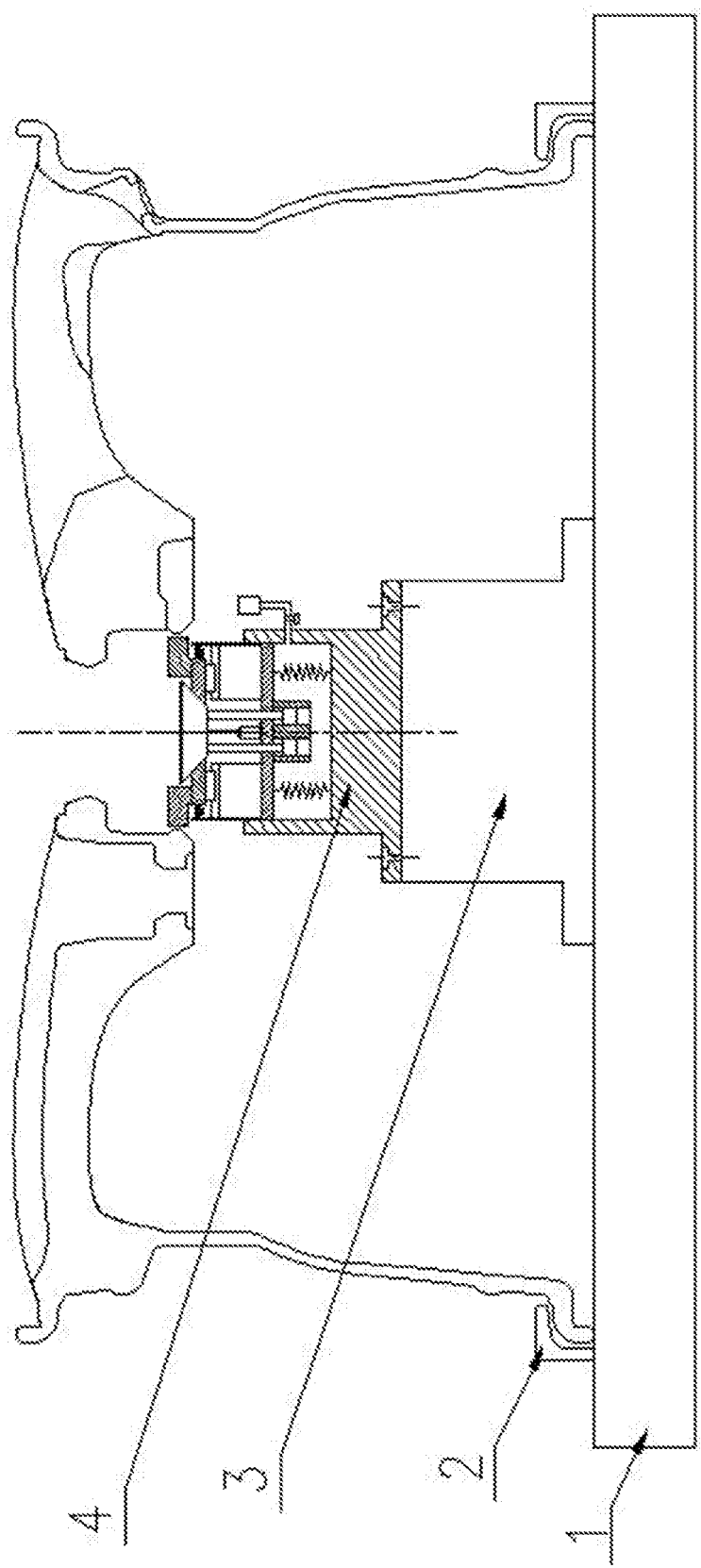
FIG. 4 is a structural schematic diagram of a fixture of the present disclosure.

Embodiment 3 provides an adjustable fixture for machining a wheel, as shown in FIGS. 2-4, comprising pressing jaws 2 and a mandrel seat 3. The pressing jaws 2 are corner cylinder pressing jaws, and a plurality of pressing jaws 2 are evenly distributed along the circumference. The mandrel seat 3 is fixed at the central position of the fixture and is arranged at the central position of a rotary table 1 as shown in FIG. 4. The adjustable fixture further comprises an adjustable mandrel as described in embodiment 2, and the adjustable mandrel is mounted to the mandrel seat 3. The detailed structure of the adjustable mandrel is as described in embodiment 2, and with reference to FIG. 2-3, the adjustable mandrel comprises a cylinder block 5, mounting holes 6, first springs 7, a sleeve 8, a piston 9, push rods 10, guide rails 11, second springs 12, sliders 13, discs 14, a conical block 15, a pull rod 16, an electric cylinder 17, a column barrel 18, a chassis 19, an oil cup 20, an oil pipe 21, and a valve 22. The adjustable mandrel for machining the wheel comprises two large adjusting assemblies. One is an outer-diameter adjusting assembly, wherein the outer-diameter adjusting assembly can adjust the outer diameter of the positioning mandrel. The other is a height adjusting component which can adjust the height of the positioning mandrel. The two adjusting components supplement each other (are linkage), and the outer diameter and the height of the positioning mandrel can be adjusted according to wheels with different specifications.

As shown in FIG. 2-3, the column barrel 18 is fixed on the chassis 19, and four guide rails 11 are evenly arranged on the chassis 19 at intervals of 90 degrees. Four sliders 13 are respectively fixed on the four guide rails 11, and the sliders 13 are connected with the inner wall of the column barrel 18 through second springs 12, and four discs 14 are respectively arranged on the four sliders 13. The electric cylinder 17 is fixed on the chassis 19, the output end of the electric cylinder 17 is connected with the pull rod 16, the pull rod 16 is connected with the conical block 15, and the conical surface of the conical block 15 is matched with the conical surface on the sliders 13. When the electric cylinder 17 is activated, it pulls down conical block 15 through the pull rod 16, drives four sliders 13 to move outwards along the guide rails 11 simultaneously, makes four discs 14 simultaneously move outwards, and an circumcircle can be formed by vertices on outer sides of the four discs 14. By adjusting the height of conical block 15, the diameter of the circumcircle can be adjusted to match the diameter of the wheel center hole for radial positioning purposes. This is an outer diameter adjustment assembly that can adjust the positioning outer diameter of the fixture.

The upper ends of the two push rods 10 are fixed on the conical block 15, and the lower ends of the two push rods 10 are connected with the piston 9, and the piston 9 is matched with a cylinder tube in the sleeve 8, and the sleeve 8 is fixed on the chassis 19. The outer wall of the column barrel 18 is matched with the inner wall of the cylinder block 5, and the column barrel and the inner wall of the cylinder block 5 form a confined space, and hydraulic oil is filled in the confined space, and the chassis 19 is connected with the cylinder block 5 through the first spring 7. The oil tube 21 is drawn from a side wall of the cylindrical cavity of the cylinder block 5, the oil tube 21 is provided with the valve 22, and a tail end of the oil tube 21 is connected to the oil cup 20. When the outer-diameter adjusting assembly works, the conical block 15 moves downwards, and the push rod 10 pushes the piston 9 to move downwards, and hydraulic oil in the closed space is subjected to extrusion force. Under the action of the extrusion force, the chassis 19 and the column barrel 18 together form a combined piston body. Upon overcoming the spring resistance, the combined piston body is moved upwards along the inner wall of the cylinder block 5, causing the fixture to rise to a certain height. Opening the valve 22, hydraulic oil will flow through the oil tube 21 into the cup 20, while the height of the fixture is lowered, that is, the height of the fixture can be adjusted by the valve 22 to match the height required for wheel alignment. This is a height adjusting assembly.

In this embodiment, working process of an adjustable fixture for wheel machining is as below. Instead of the mandrel 4, an adjustable mandrel is mounted on the mandrel seat 3 through mounting holes 6. Firstly, the electric cylinder 17 is activated, pulling down the conical block 15 by means of the pull rod 16, adjusting the positioning outer diameter of the adjustable mandrel to match the diameter of the central hole of the wheel. Secondly, the height of the adjustable mandrel is then adjusted via valve 22 to match the height required for wheel alignment. Therefore, the positioning diameter and the positioning height of the fixture are adjusted. The radial fixation of the wheel is achieved by the four discs 14, and the axial fixation of the wheel is achieved by the upper end surface of the rotary table 1, and the wheel is pressed tightly through the corner cylinder pressing jaws 2. The fixture in this embodiment 3 is able to fulfill the function of the adjustable mandrel, enabling radial positioning of the wheel in two-step processing, adjusting its outer diameter and height according to different specifications of the wheel, and the outer-diameter adjusting assembly and the height adjusting assembly are linked, novel, elegant and versatile.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. An adjustable mandrel, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel.

2. The adjustable mandrel according to claim 1, wherein the outer-diameter adjusting assembly comprises guide rails, sliders, discs, second springs, a conical block, a pull rod and an electric cylinder, two or more guide rails are evenly distributed along the circumference, each guide rail is provided with a slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable.

3. The adjustable mandrel according to claim 2, wherein the outer-diameter adjusting assembly further comprises a column barrel, the column barrel is fixed to the height adjusting assembly, the guide rails are located in the column barrel, one end on the outer side of each slider is fixed to an inner wall of the column barrel through the corresponding second spring, and the discs are higher than the column barrel.

4. The adjustable mandrel according to claim 1, wherein the height adjusting assembly comprises a cylinder block, a chassis, an oil tube, a valve, and a hydraulic pump, the outer-diameter adjusting assembly is disposed on the chassis, an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the valve is disposed on the oil tube, and a tail end of the oil tube is connected to the hydraulic pump; when the valve is opened, the hydraulic pump extracts the hydraulic oil, and the chassis and the outer-diameter adjusting assembly descend; when the hydraulic pump injects the hydraulic oil, the chassis and the outer-diameter adjusting assembly ascend.

5. The adjustable mandrel according to claim 4, wherein the chassis is connected to the bottom of the cylindrical cavity on the upper end of the cylinder block through first springs.

6. The adjustable mandrel according to claim 1, wherein the outer-diameter adjusting assembly and the height adjusting assembly are linked; the outer-diameter adjusting assembly adjusts the diameter of the circumcircle on the upper end face of the mandrel to be larger, while the outer-diameter adjusting assembly forces the height adjusting assembly to increase the height of the mandrel; the outer-diameter adjusting assembly adjusts the diameter of the circumcircle on the upper end face of the mandrel to be smaller, while the outer-diameter adjusting assembly forces the height adjusting assembly to decrease the height of the mandrel.

7. The adjustable mandrel according to claim 6, wherein the outer-diameter adjusting assembly comprises guide rails, sliders, discs, second springs, a conical block, a pull rod, and an electric cylinder, two or more guide rails are evenly distributed along the circumference, each guide rail is provided with the corresponding slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable;

the height adjusting assembly comprises push rods, a piston, a sleeve, a cylinder block, a chassis, an oil tube, a valve, and an oil cup, the electric cylinder is fixed to an upper surface of the chassis, a bottom surface of the chassis is fixedly provided with the sleeve, upper ends of two push rods are fixed to the conical block, a through hole is formed in the chassis at a position corresponding to each push rod, lower ends of the two push rods pass through the through holes to connect to the piston, and the piston is matched with a cylinder tube in the sleeve; an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the oil tube is provided with the valve, and a tail end of the oil tube is connected to the oil cup; and the electric cylinder drives the conical block to descend, the push rods push the piston to move down, the hydraulic oil in the confined space is squeezed, the chassis moves up along an inner wall of the cylindrical cavity of the cylinder block, making the outer-diameter adjusting assembly ascend; when the valve is opened, the hydraulic oil flows into the oil cup through the oil tube, and the height of the chassis drops, making the outer-diameter adjusting assembly descend.

8. The adjustable mandrel according to claim 7, wherein the chassis is connected to the bottom of the cylindrical cavity on the upper end of the cylinder block through first springs.

9. The adjustable mandrel according to claim 7, wherein the outer-diameter adjusting assembly further comprises a column barrel, the column barrel is fixed to the chassis, the guide rails are fixed to the chassis and are located in the column barrel, one end on the outer side of each slider is fixed to an inner wall of the column barrel through the corresponding second spring, and the discs are higher than the column barrel.

10. A fixture, comprising pressing jaws and a mandrel seat, the pressing jaws being evenly distributed along the circumference, and the mandrel seat being fixed at a central position of the fixture, wherein the fixture further comprises a adjustable mandrel, and the adjustable mandrel is mounted to the mandrel seat;

the adjustable mandrel, comprising an outer-diameter adjusting assembly and a height adjusting assembly, wherein the outer-diameter adjusting assembly can adjust the diameter of a circumcircle on an upper end face of the mandrel to make an upper end of the mandrel be matched with the diameter of a central hole of a wheel, and the height adjusting assembly can adjust the height of the mandrel so that the upper end of the mandrel extends into the central hole to achieve radial positioning of the wheel.

11. The fixture according to claim 10, wherein the outer-diameter adjusting assembly comprises guide rails, sliders, discs, second springs, a conical block, a pull rod, and an electric cylinder, two or more guide rails are evenly distributed along the circumference, each guide rail is provided with a slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable.

12. The fixture according to claim 11, wherein the outer-diameter adjusting assembly further comprises a column barrel, the column barrel is fixed to the height adjusting assembly, the guide rails are located in the column barrel, one end on the outer side of each slider is fixed to an inner wall of the column barrel through the corresponding second spring, and the discs are higher than the column barrel.

13. The fixture according to claim 10, wherein the height adjusting assembly comprises a cylinder block, a chassis, an oil tube, a valve, and a hydraulic pump, the outer-diameter adjusting assembly is disposed on the chassis, an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the valve is disposed on the oil tube, and a tail end of the oil tube is connected to the hydraulic pump; when the valve is opened, the hydraulic pump extracts the hydraulic oil, and the chassis and the outer-diameter adjusting assembly descend; when the hydraulic pump injects the hydraulic oil, the chassis and the outer-diameter adjusting assembly ascend.

14. The fixture according to claim 13, wherein the chassis is connected to the bottom of the cylindrical cavity on the upper end of the cylinder block through first springs.

15. The fixture according to claim 10, wherein the outer-diameter adjusting assembly and the height adjusting assembly are linked; the outer-diameter adjusting assembly adjusts the diameter of the circumcircle on the upper end face of the mandrel to be larger, while the outer-diameter adjusting assembly forces the height adjusting assembly to increase the height of the mandrel; the outer-diameter adjusting assembly adjusts the diameter of the circumcircle on the upper end face of the mandrel to be smaller, while the outer-diameter adjusting assembly forces the height adjusting assembly to decrease the height of the mandrel.

16. The fixture according to claim 15, wherein the outer-diameter adjusting assembly comprises guide rails, sliders, discs, second springs, a conical block, a pull rod, and an electric cylinder, two or more guide rails are evenly distributed along the circumference, each guide rail is provided with the corresponding slider, the corresponding second spring is fixed to one end on an outer side of each slider, one end on an inner side of each slider is of a conical surface, and the corresponding disc is fixedly arranged on an upper surface of each slider; the pull rod is fixed to a piston rod of the electric cylinder, the pull rod is fixed to a bottom surface of the conical block, an inclined surface of the conical block is matched with the conical surfaces on the inner sides of the sliders, the electric cylinder drives the conical block to move through the pull rod, the conical block pushes the sliders to slide along the guide rails, and the discs move along with the sliders, so that the diameter of a circumcircle formed by vertices on outer sides of all the discs is adjustable;

the height adjusting assembly comprises push rods, a piston, a sleeve, a cylinder block, a chassis, an oil tube, a valve, and an oil cup, the electric cylinder is fixed to an upper surface of the chassis, a bottom surface of the chassis is fixedly provided with the sleeve, upper ends of two push rods are fixed to the conical block, a through hole is formed in the chassis at a position corresponding to each push rod, lower ends of the two push rods pass through the through holes to connect to the piston, and the piston is matched with a cylinder tube in the sleeve; an upper end of the cylinder block is provided with a cylindrical cavity, the chassis is disposed in the cylindrical cavity, the chassis is matched with the cylindrical cavity to form a confined space, the confined space is filled with hydraulic oil, the oil tube is drawn from a side wall of the cylindrical cavity of the cylinder block, the oil tube is provided with the valve, and a tail end of the oil tube is connected to the oil cup; and the electric cylinder drives the conical block to descend, the push rods push the piston to move down, the hydraulic oil in the confined space is squeezed, the chassis moves up along an inner wall of the cylindrical cavity of the cylinder block, making the outer-diameter adjusting assembly ascend; when the valve is opened, the hydraulic oil flows into the oil cup through the oil tube, and the height of the chassis drops, making the outer-diameter adjusting assembly descend.

17. The fixture according to claim 16, wherein the chassis is connected to the bottom of the cylindrical cavity on the upper end of the cylinder block through first springs.

18. The fixture according to claim 16, wherein the outer-diameter adjusting assembly further comprises a column barrel, the column barrel is fixed to the chassis, the guide rails are fixed to the chassis and are located in the column barrel, one end on the outer side of each slider is fixed to an inner wall of the column barrel through the corresponding second spring, and the discs are higher than the column barrel.

* * * * *